United States Patent

Lovely

[11] 3,860,251
[45] Jan. 14, 1975

[54] REED MOUNTED CHUCK
[75] Inventor: John W. Lovely, Springfield, Vt.
[73] Assignee: Bryant Grinder Corporation, Springfield, Vt.
[22] Filed: May 29, 1973
[21] Appl. No.: 364,849

[52] U.S. Cl. .................................... 279/4, 279/119
[51] Int. Cl. ...................... B23b 31/16, B23b 31/30
[58] Field of Search ........... 279/119, 110, 120, 118, 279/123, 4, 74, 66

[56] References Cited
UNITED STATES PATENTS
608,449   8/1898   Gauthier ............................ 279/120
2,224,639   12/1940   Ward .................................. 279/119

*Primary Examiner*—Gil Weidenfeld
*Attorney, Agent, or Firm*—James H. Bower; Mitchell J. Hill

[57] ABSTRACT

This disclosure relates to power chucks, and in general to bell-crank chucks providing greater radial rigidity and no axial motion of the workpiece during chuck closure by means of reed mounted jaws.

3 Claims, 3 Drawing Figures

PATENTED JAN 14 1975 3,860,251
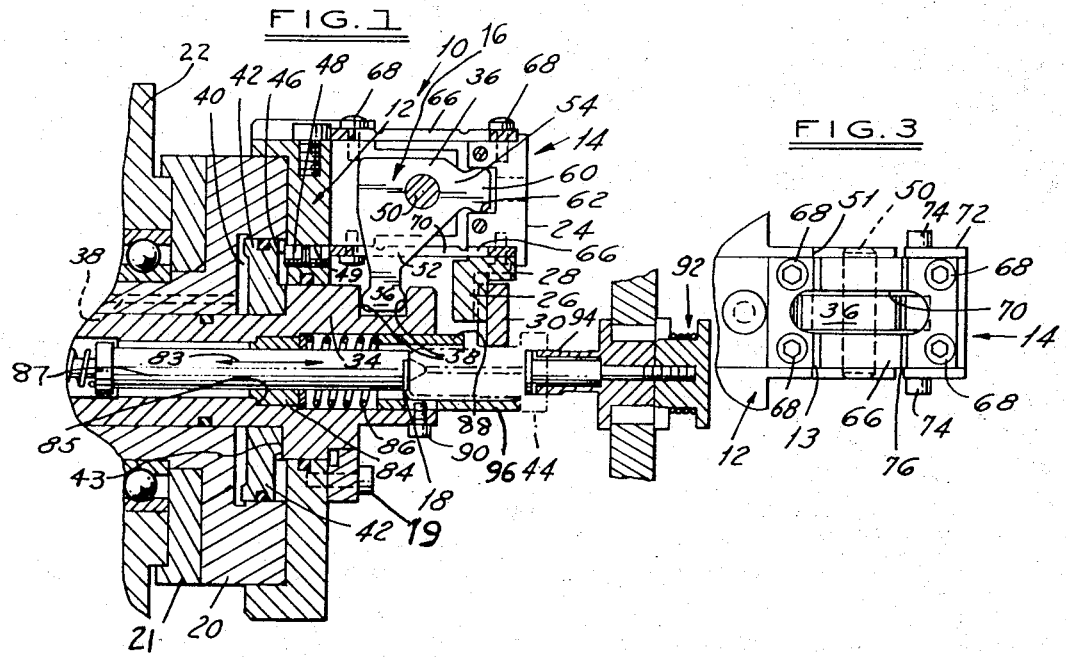
FIG.1
FIG.3
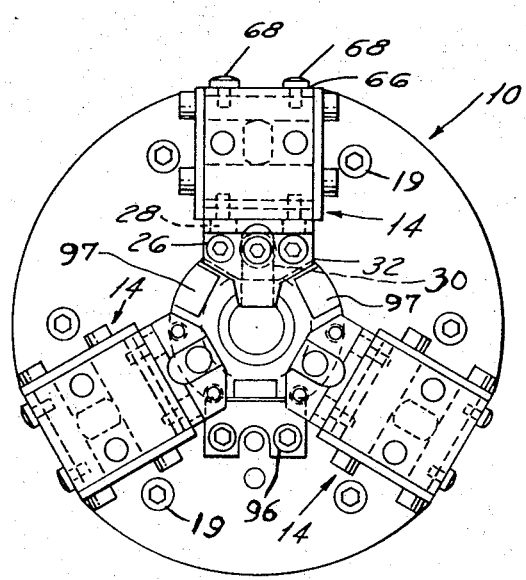
FIG.2

REED MOUNTED CHUCK

BACKGROUND OF THE INVENTION

U.S. Letters Pat. Nos. 2,224,639, 3,251,606, and RE 24,684 refer to chucks that are similar in concept, however, none of the references show reed mounted jaws.

SUMMARY OF THE INVENTION

This invention relates a bell-crank chuck having reed mounted jaws which provide greater radial rigidity and no axial motion of the workpiece during chuck closure.

DESCRIPTION OF THE DRAWINGS

FIG. 1 is a cross-sectional longitudinal view of the chuck;

FIG. 2 is a view of one end thereof;

FIG. 3 is a partial cross-sectional of the reeds.

DESCRIPTION OF THE INVENTION

Referring to the drawings, and more particularly to FIG. 1 and FIG. 2, the reference numeral 10 designates a chuck on a spindle which comprises a body 12, jaws 14, jaw-operating mechanism or bell crank lever mechanism 16, and a work center 18. The chuck body 12 is secured by bolts 19 on the power operated work spindle 20 of a lathe or other machine tool. A bearing retainer 21 is secured (not shown) to the housing 22 of the spindle.

Each of the jaws 14 comprises a customary master jaw 24, a jaw retainer 26 secured to the jaw 24 by screws 28, and work gripping jaw 30, which is secured to the jaw retainer 26 by screws 32.

The jaw-operating mechanism 16 comprises, a plunger 34 and a plurality of bell crank levers 36 which are operated by the plunger 34, and in turn operate the jaws 14 with which they are associated. The plunger 34 is adapted to be axially movable when air is forced through bore 38 into recess 40 thus moving piston 42. The amount of travel the cylinder piston 42 is moved in space 46 is determined by adjustable threaded plug 48 which is threaded into a bore 49 of body 12. The plunger 34 therefore is movable by piston 42 in an axial direction because of abutting surfaces 43 between piston 42 and plunger 34.

The bell crank levers 36 are pivotally mounted on pins 50 in a cage or carrier 51 in the body recess 13 of body 12. The bell crank comprises diverging arms 52 and 54 of which the free or follower ends 56 are roller shaped and project into a peripheral groove 58 in plunger 34. The free ends 60 of the arm 54 are also roller shaped and project into the transverse grooves 62 in the rear of master jaws 24 for their operating connection. Each of jaws 14 is connected to the body 12 by means of two parallel reeds 66 which are threadedly secured thereto by screws 68. The parallel reeds are substantially rigid arms, but have, sufficient yieldable flexure to provide radial movement of the jaw 14 supported thereon when the jaw is actuated by lever 36. Each of the reeds 66 have a central elongated opening 70 which allows arm 52 of bell crank lever 36 to extend therethrough. Side panels 72 are secured to jaw 14 by screws 74. As shown in FIG. 3, a gap 76 exists between the jaws 14 and cage or carrier 51 of body 12, thus allowing movement of jaws 14 to receive workpiece 44.

The work center 18 is coaxially arranged of the chuck spindle axis on a rod 82 which is movable longitudinally to eject the workpiece 44. The rod 82 is movable longitudinally as shown by the arrow 83. When plunger 34 is moved forwardly, or toward the workpiece, bushing 84 which encircles rod 82 and abuts against shoulder 85 of plunger 34 moves forwardly compressing spring 86. The bias of spring 86 retains bushing 84 against shoulder 85. At the opposite end of spring 86, or the work center end 18, spring loaded backing member 88 is secured to the plunger 34 by screws 90. The spring loaded backing member 88 maintains the spring 86 in a biasing condition against the rear bushing 84.

The workpiece 44 is loaded onto the chuck by means of a loading arm 92, with a loading plug 94 holding the workpiece 44 in proper position until the chuck jaws are activated to retain the workpiece. Similarly when machining operations are completed, the loading arm 92 swings into position and the loading plug 94 then removes the finished workpiece. Each of the spring loaded backing members 88 includes an extended portion 96 to support the workpiece during operation. The spring loaded backing members 88 fit into the slots 97 of plunger 34.

Since operation of any of the levers 36 independently of the other levers is impossible in view of the operating connections with the common plunger 34, it is only on simultaneous operation of all levers that the workpiece is securely gripped in the jaws.

The exemplary bell crank levers 34 are highly advantageous, not only because they permit opening and closing motion of the compensating jaws to an extent comparable to that of the common operating plunger and thus adapt the chuck to work of widely varying dimensions, but provide great radial rigidity. Thus, there is no axial motion of the workpiece during chuck closure. The jaws are guided through essentially pure radial motion, with negligible axial motion, by the parallel reed pairs. Centering action and radial stiffness are provided by the individual bellcranks and the common plunger which moves them in unison.

I claim:

1. In a chuck, a body, a plurality of jaws, jaw actuating levers, a plurality of radially extending chambers therein for receiving said jaw actuating levers, journal pins associated with said levers for pivotal movement, means for rocking said levers about said journal pins, each of said jaws being mounted to two parallel reeds, and said parallel reeds mounted to said body and interconnected with said levers for yieldable deflection in a radial direction when actuated by said levers, and an actuating means to simultaneously move said levers to deflect said parallel reeds thereby moving said jaws radially.

2. In a work holder as described in claim 1, each of said jaw actuating levers comprises a bell crank lever.

3. In a work holder as described in claim 2, each of said parallel reeds comprises an elongated central opening whereby an arm of said bell crank lever extends therethrough to interact with said actuating means.

* * * * *